United States Patent [19]
Javitt et al.

[11] Patent Number: 6,031,648
[45] Date of Patent: Feb. 29, 2000

[54] AUTOMATIC GAIN CONTROL FOR FREE-SPACE OPTICAL TELECOMMUNICATIONS LINKS

[75] Inventors: Joel I. Javitt, Hillside; Christopher L. Rutledge, Somerset, both of N.J.

[73] Assignee: AT&T Corp., New York, N.Y.

[21] Appl. No.: 08/847,072

[22] Filed: May 1, 1997

[51] Int. Cl.[7] .................................................. H04B 10/00
[52] U.S. Cl. ...................... 359/161; 359/124; 359/154; 359/159; 359/194
[58] Field of Search ..................................... 359/161, 159, 359/194, 172, 154, 124

[56] References Cited

U.S. PATENT DOCUMENTS

| | | | |
|---|---|---|---|
| 3,546,465 | 12/1970 | Arnaud | 359/154 |
| 3,566,128 | 2/1971 | Arnaud | 359/154 |
| 4,271,503 | 6/1981 | Eumurian et al. | 359/194 |
| 5,390,185 | 2/1995 | Hooijmans et al. | 359/124 |
| 5,610,748 | 3/1997 | Sakanaka et al. | 359/159 |
| 5,617,240 | 4/1997 | Hergault et al. | 359/161 |
| 5,768,000 | 6/1998 | Tajima | 359/161 |

*Primary Examiner*—Jeffery A. Hofsass
*Assistant Examiner*—John Tweel, Jr.

[57] ABSTRACT

Free-space optical transmission of analog information is facilitated by transmitting constant-amplitude pilot information with the other information. The amount of attenuation of the pilot information at the receiver is detected and used to control the amount by which received information is amplified. In this way the deleterious effects of free-space optical attenuation are substantially eliminated. The pilot information may be transmitted either via its own separate light frequency or wavelength, or as a distinguishable part of a larger quantity of information that is used to modulate one light frequency or wavelength.

20 Claims, 2 Drawing Sheets

AUTOMATIC GAIN CONTROL FOR FREE-SPACE OPTICAL TELECOMMUNICATIONS LINKS

BACKGROUND OF THE INVENTION

This invention relates to free-space optical telecommunications, and more particularly to automatic gain control for free-space optical telecommunications links.

Free-space optical telecommunications offers an attractive alternative to hard-wired or radio communication in certain situations. For example, a telecommunications services provider who wants to enter a new geographical area may have little or no hard-wired plant in that area and may wish to avoid the cost and complexity of installing such plant to serve the new area. Similarly, radio communications resources are limited and regulated, and a new telecommunications services provider may not have sufficient rights to use those resources in a new geographical area.

Free-space optical telecommunication is therefore attractive because it avoids the need for hard-wired plant and because, unlike radio telecommunication, it is essentially unregulated. Optical telecommunication also has the advantage of very large information capacity. Thus optical telecommunications links can support a wide range of telecommunications services such as telephone, video, audio, and computer data transmission.

A possible problem with free-space optical telecommunication is that it is subject to time-varying attenuation through the atmosphere. For example, infrared or other light may scintillate at frequencies up to about 200 Hz as it passes through the atmosphere. Digital modulation of the light is one way to render free-space optical information transmission more immune from these atmospheric effects. However, digital modulation tends to increase transmission cost for at least some types of information, especially information which is initially in analog form and which is ultimately used in analog form. This is true, for example, for most telephone information and much video (television) information.

In view of the foregoing, it is an object of this invention to improve free-space optical telecommunication.

It is a more particular object of this invention to reduce the deleterious effects on analog, free-space, optical telecommunication of atmospheric disturbances such as scintillation.

SUMMARY OF THE INVENTION

These and other objects of the invention are accomplished in accordance with the principles of the invention by providing analog free-space optical telecommunications apparatus in which a so-called pilot signal of known amplitude is sent along with the information signal via the free-space optical link. At the receiving end of the link, the pilot signal is separated from the information signal. The amplitude of the received pilot signal is compared to a reference, and the amount of deviation from the reference is used to control an amount by which the information signal is amplified. The pilot signal may be sent using a separate light wavelength which is preferably close to the light wavelength(s) used for the information signal. Alternatively, the pilot signal may be one of the frequencies used to modulate the light frequency that also carries the information signal. The comparison of the received pilot signal to a reference, and the automatic amplification variation of the received information signal are preferably done electronically at the receiver.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
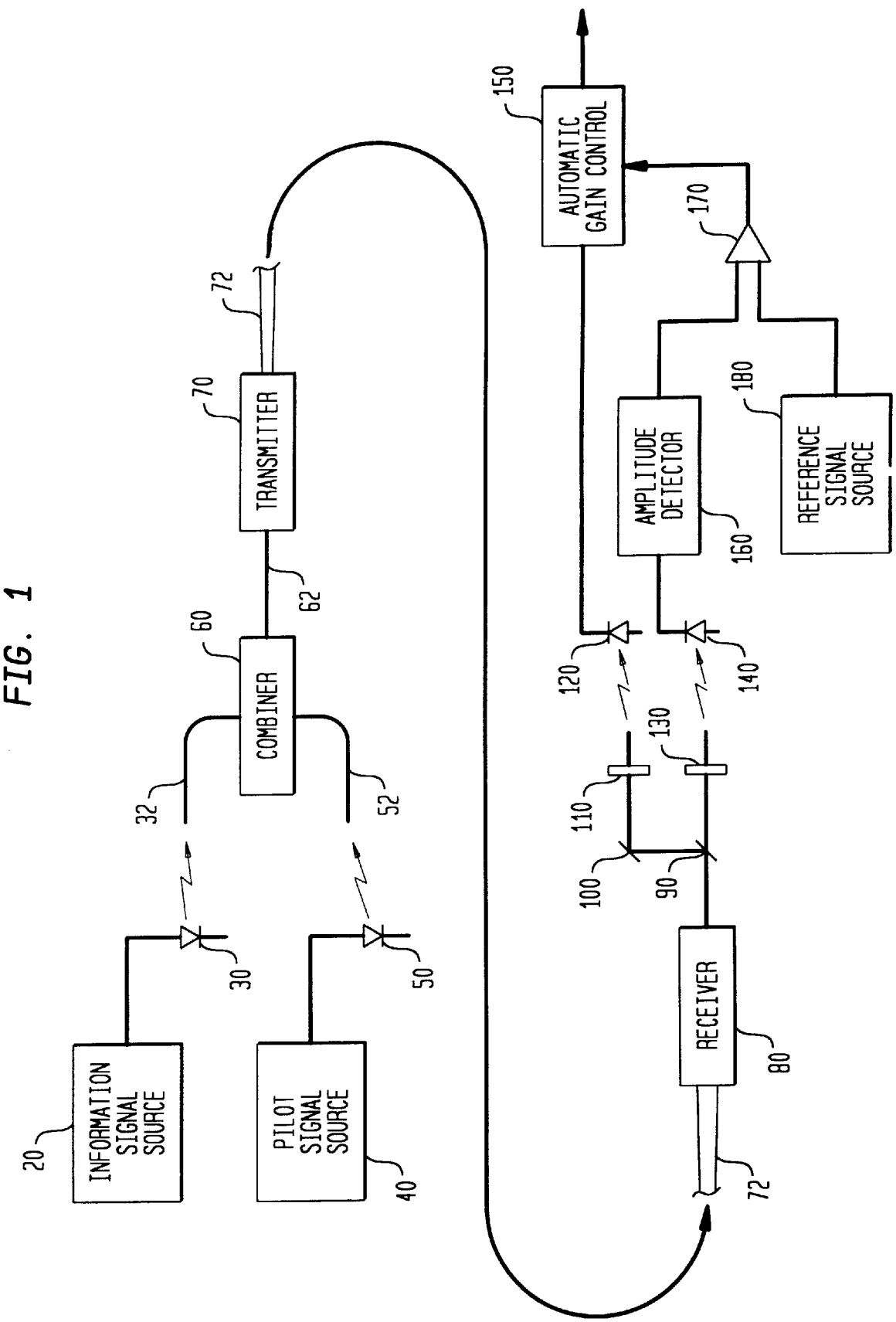
FIG. 1 is a simplified schematic block diagram of a first illustrative embodiment of free-space optical communications apparatus constructed in accordance with the invention.

In the first illustrative embodiment shown in FIG. 1 the pilot signal is sent via a wavelength which is different from the wavelength used for the information signal. Information signal source 20 produces an output electrical signal which is analog-modulated with the information to be transmitted. This information signal is applied to light source 30 (e.g., a laser diode) to cause that light source to output light having the same analog modulation as the applied electrical signal. The frequency or wavelength of the light produced by light source 30 is different from, but preferably relatively close to, the frequency or wavelength of the light produced by light source 50 (described below). The light from light source 30 is applied to one input of combiner 60 via optical fiber 32.

Pilot signal source 40 produces an output signal of constant magnitude. The output signal of source 40 is applied to light source 50 (e.g., another laser diode) to cause that light source to produce light of constant intensity. The light produced by light source 50 is applied to a second input of combiner 60 via optical fiber 52.

Combiner 60 combines the light from optical fibers 32 and 52 and produces a single light output on optical fiber 62. Thus the light carried by optical fiber 62 is the information signal on one light frequency or wavelength, and the pilot signal on another light frequency or wavelength.

Optical fiber 62 is connected to light transmitter 70, which launches the light it receives via optical fiber 62 into free space as shown at 72. For example, transmitter 70 may be a lens system for appropriately focusing the light for free-space transmission 72.

After traveling a desired distance through free space (e.g., the earth's atmosphere), light 72 is received by receiver 80. Receiver 80 may be another lens system for focusing the received light toward light splitter 90. Splitter 90 allows a portion of the light it receives to pass through to filter 130. Splitter 90 deflects the remainder of the light it receives to mirror 100. Mirror 100 deflects the light it receives to filter 110.

Filter 110 passes only light having the frequency or wavelength produced by light source 30. The light passed by filter 110 is applied to photodetector 120, which accordingly produces an output electrical signal containing the information from source 30 as received at receiver 80. This electrical signal is applied to the main input of automatic gain control circuit 150.

Filter 130 passes only light having the frequency or wavelength produced by light source 50. The light passed by filter 130 is applied to photodetector 140, which therefore produces an electrical output signal indicative of the received pilot signal. The output signal of photodetector 140 is applied to amplitude detector 160, which produces an output signal indicative of the amplitude of the received pilot signal.

The output signal of amplitude detector 160 is applied to one input of differential or operational amplifier 170. The other input to amplifier 170 is a constant reference signal from reference signal source 180. Amplifier 170 produces an output signal which is indicative of the amount by which the output of amplitude detector 160 differs from the reference signal from source 180. The output signal of amplifier 170 is applied to the control input of automatic gain control circuit 150.

Automatic gain control circuit 150 amplifies the signal applied to its main input (i.e., from photodetector 120) by an amount proportional to the magnitude of the signal applied to its control input (i.e., from amplifier 170). Because both the information signal light and the pilot signal light travel along the same free-space optical path and have frequencies that are fairly close to one another, both of these lights experience approximately the same attenuations as they pass through the free space. For example, both the information light and the pilot light scintillate approximately similarly as they pass through the atmosphere between transmitter 70 and receiver 80. The pilot light, however, is known to start out with constant intensity. Therefore, the amount by which the output signal of amplitude detector 160 deviates from the constant reference signal from source 180 at any instant of time is a good indicator of the concurrent attenuation of the received information light. Automatic gain control circuit 150 automatically compensates for this attenuation by amplifying the received information signal by the amount required to substantially eliminate the effects of the time-varying attenuation of light through the free space between transmitter 70 and receive 80.

Figure 2:
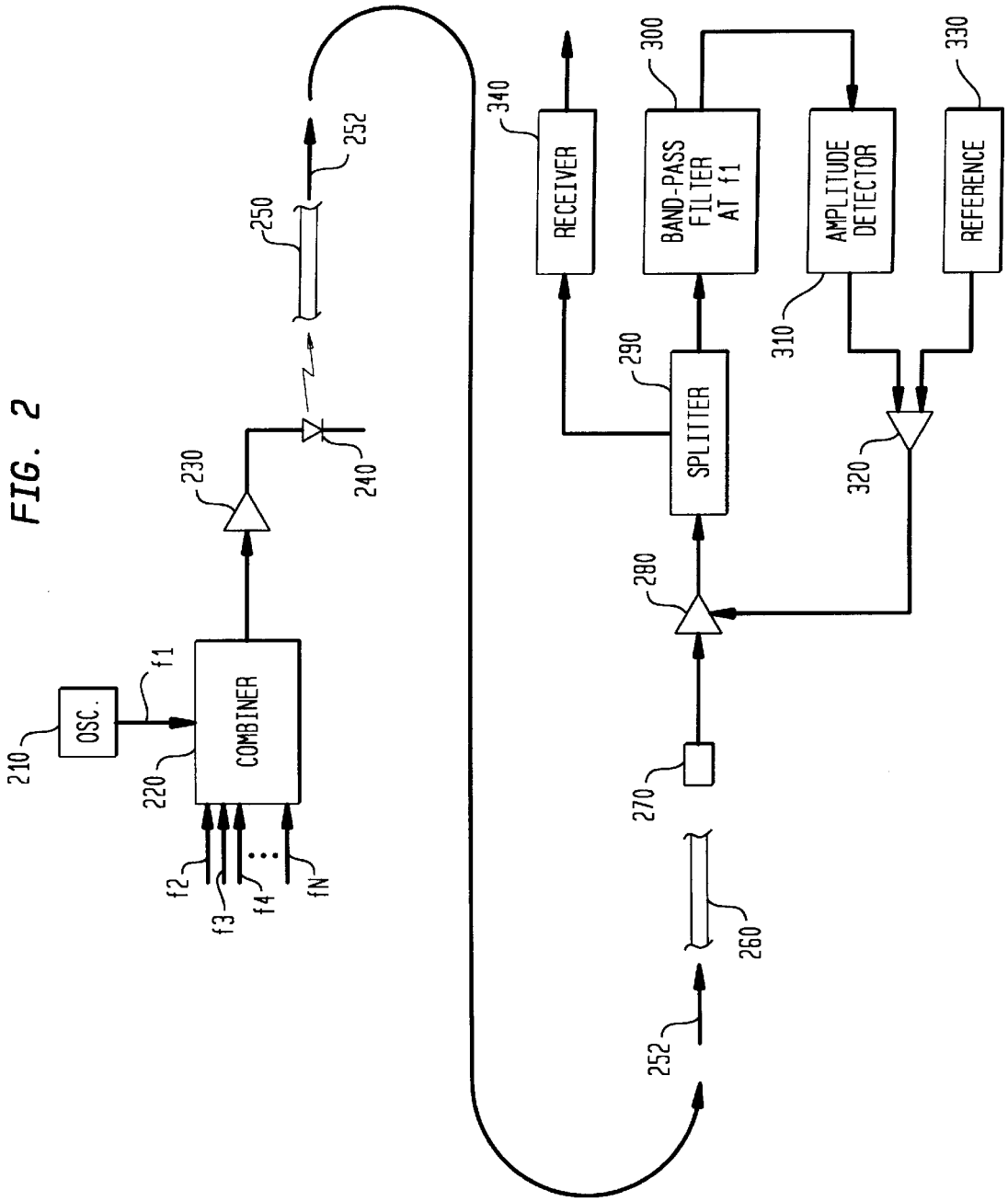
FIG. 2 is a simplified schematic block diagram of a second illustrative embodiment of free-space optical communications apparatus constructed in accordance with the invention.

In the alternative embodiment shown in FIG. 2 the pilot signal is used along with the information signal to modulate a single light frequency or wavelength, rather than separate light frequencies or wavelengths being used for the information and pilot signals as in FIG. 1. As shown in FIG. 2, several information signals are used to analog-modulate several different electrical signal frequencies f2–fN. A pilot signal produced by oscillator 210 has another frequency f1. The amplitude of this pilot signal is preferably constant.

All of signals f1–fN are applied to combiner 220, which combines all of the applied signals into one frequency-division-multiplexed signal that is applied to amplifier/driver 230. The output signal of amplifier/driver 230 is applied to light source 240 (e.g., a laser diode). The light produced by light source 240 is applied to transmitter 250 (e.g., a lens system) for appropriately launching the light from source 240 into free space as indicated at 252.

After traveling the desired distance through free space, the light 252 from transmitter 250 is received by receiver 260 (e.g., another lens system) for focusing the received light on photodetector 270. Photodetector 270 produces an output electrical signal indicative of the received light. This output signal is applied to the main input of variable gain amplifier 280. The output signal of amplifier 280 is applied to splitter 290, which produces several replicas of the applied signal. One of these replicas is applied to band-pass filter 300, which passes substantially only frequency f1, the frequency used for the pilot signal. The output signal of band-pass filter 300 is applied to amplitude detector 310, which therefore produces an output signal indicative of the strength of the pilot signal from filter 300. The output signal of amplitude detector 310 is applied to summation amplifier 320. The other input to amplifier 320 is a constant reference signal 330. The output signal of amplifier 320 is indicative of the amount by which the pilot signal amplitude from band-pass filter 300 deviates from reference 330. The output signal of amplifier 320 is applied to the control input of amplifier 280 to control the amount by which amplifier 280 amplifies the signal from detector 270. Any weakening of the received pilot signal increases the gain produced by amplifier 280.

Another signal replica produced by splitter 290 is applied to receiver 340, which may be any suitable device or devices for recovering and utilizing information signals f2–fN.

It will be apparent that the effect of the apparatus shown in FIG. 2 is similar to the effect of the apparatus shown in FIG. 1. In particular, the constant amplitude pilot signal is used to detect time-varying attenuation of the light transmitted through free space from transmitter 250 to receiver 260. Amplification of the received signal is automatically varied to compensate for this attenuation and thereby effectively eliminate it.

It will be understood that the foregoing is only illustrative of the principles of the invention, and that various modifications can be made by those skilled in the art without departing from the scope and spirit of the invention. For example, in the embodiment shown in FIG. 1 several different information light frequencies or wavelengths can be sent with pilot light frequency from transmitter 70 to receiver 80.

The invention claimed is:

1. Apparatus for free-space optical transmission of information comprising:

a transmitter for optically transmitting, via free space, said information together with pilot information of fixed strength said transmitter including:

a first source of light having a first frequency which is amplitude-modulated with said information, a second source of light having a second frequency and constant amplitude in order to represent said pilot information, said first and second frequencies being different from one another, and a combiner for launching said light from said first and second sources onto a substantially common optical path through said free space; and a receiver for receiving from said free space said information and said pilot information, said receiver including:

a detector for producing an output indicative of the strength of said pilot information as received by said receiver, said detector including a first photodetector assembly which is responsive to light having substantially only said first frequency for producing a first electrical output signal indicative of said information as received by said receiver, a second photodetector assembly which is responsive to light having substantially only said second frequency for producing a second electrical output signal indicative of the strength of said light of said second frequency as received by said receiver, a reference signal source for producing an output of constant amplitude, an amplifier for producing an output indicative of an amount by which said output of said second detector differs from said reference signal source output, and a variable gain amplifier for amplifying said information as received by said receiver by an amount influenced by said output indicative of said amount by which said output of said second detector differs from said reference signal.

2. The apparatus defined in claim 1 wherein amplification by said amplifier increases when said output indicates decreasing strength of said pilot information as received by said receiver.

3. The apparatus defined in claim 1 wherein said transmitter includes:

a first source of a first electrical signal having a first frequency which is amplitude-modulated with said information;

a second source of a second electrical signal having a second frequency of constant amplitude in order to represent said pilot information, said first and second frequencies being different from one another;

a combiner for combining said first and second electrical signals in order to produce a third electrical signal; and an electro-optical transducer for producing light which is amplitude-modulated in accordance with said third electrical signal.

4. The apparatus defined in claim 3 wherein said receiver further includes:

a photodetector for producing a fourth electrical signal indicative of modulation of light received by said receiver; wherein said detector includes:

a filter circuit for producing a fifth electrical signal which is indicative of the strength of the component of said fourth electrical signal having said second frequency; and wherein said amplifier includes:

an electrical signal amplifier for amplifying said fourth electrical signal by an amount influenced by said fifth electrical signal.

5. The method of transmitting information optically through free space from a transmitter to a receiver comprising the steps of:

transmitting light representing said information together with pilot information of predetermined strength from said transmitter through said free space toward said receiver, wherein said transmitting step comprises the steps of;

amplitude-modulating at least a component of said light with said information, transmitting another component of said light with constant amplitude to represent said pilot information, said component and said another component have different light frequencies;

receiving said light at said receiver; detecting the strength of said pilot information as received via said light at said receiver, wherein said detecting step comprises the step of:

directing light received at said receiver which is substantially only of the frequency used for said pilot information to photodetector circuitry which produces an output signal indicative of the strength of the light directed to it;

generating a reference signal of constant amplitude;

producing an output indicative of an amount by which said output of said photodetector circuitry differs from said reference signal;

amplifying said information as received via said light at said receiver by an amount influenced by said output indicative of an amount by which said output of said photodetector circuitry differs from said reference signal.

6. The method defined in claim 5 wherein in said amplifying step said information is amplified to a greater degree when said strength detected in said detecting step is relatively low and to a lesser degree when said strength detected in said detecting step is relatively high.

7. The method defined in claim 6 wherein said information is such that the amplitude of said light that is modulated with said information varies overtime.

8. The method defined in claim 5 wherein said amplifying step comprises the step of:

using the output signal of said photodetector circuitry to control the gain of a variable gain amplifier to which said information as received at said receiver is applied.

9. The method defined in claim 5 wherein said transmitting step comprises the steps of:

amplitude-modulating a first alternating current electrical signal with said information, said first signal having a first frequency;

amplitude-modulating a second electrical signal with a constant amplitude of modulation to represent said pilot information, said second signal having a second frequency which is different from said first frequency;

combining said first and second signals to produce a third signal; and using said third signal to amplitude-modulate said light transmitted from said transmitter.

10. The method defined in claim 9 wherein said detecting step comprises the steps of:

directing said light received at said receiver to a photodetector which produces a fourth electrical signal indicative of the light directed to it; and detecting the strength of a component of said fourth signal which has said second frequency.

11. The method defined in claim 10 wherein said amplifying step comprises the step of:

using the detected strength of said component having said second frequency in control of the amount by which said fourth signal is amplified.

12. Receiver apparatus for use in free-space optical communication of information together with pilot information of fixed strength comprising:

a detector for producing an output indicative of the strength of said pilot information as received by said receiver, said detector including a first photodetector assembly which is responsive to light having substantially only said first frequency for producing a first electrical output signal indicative of said information as received by said receiver, a second photodetector assembly which is responsive to light having substantially only said second frequency for producing a second electrical output signal indicative of the strength of said light of said second frequency as received by said receiver, a reference signal source for producing an output of constant amplitude, an amplifier for producing an output indicative of an amount by which said output of said second detector differs from said reference signal source output, a variable gain amplifier for amplifying said information as received by said receiver by an amount influenced by said output indicative of said amount by which said output of said second detector differs from said reference signal.

13. The apparatus defined in claim 12 wherein amplification by said amplifier increases when said output indicates decreasing strength of said pilot information as received by said receiver.

14. The apparatus defined in claim 12 wherein said information is communicated by amplitude-modulated light having a first frequency, wherein said pilot information is communicated by light having a second frequency and a nominally constant amplitude, wherein said detector includes:

a first photodetector assembly which is responsive to light having substantially only said first frequency for producing a first electrical output signal indicative of said information as received by said receiver; and a second photodetector assembly which is responsive to light having substantially only said second frequency for producing a second electrical output signal indicative of the strength of said light of said second frequency as received by said receiver; and wherein said amplifier comprises:

an electrical signal amplifier for amplifying said first electrical output signal by an amount influenced by said second electrical output signal.

15. The apparatus defined in claim 12 wherein said information and said pilot information are respectively communicated by modulating light with first and second frequencies, the first frequency being of varying amplitude to represent said information and the second frequency being of constant amplitude to represent said pilot information, wherein said apparatus further includes:

a photodetector for producing a first electrical signal indicative of modulation of light received by said receiver; wherein said detector includes:
a filter circuit for producing a second electrical signal which is indicative of the strength of the component of said first electrical signal having said second frequency; and wherein said amplifier includes:
an electrical signal amplifier for amplifying said first electrical signal by an amount influenced by said second electrical signal.

16. The method of receiving information transmitted, with pilot information of fixed strength, through free space via light comprising the steps of:

receiving said light at a receiver;

detecting the strength of the pilot information as received via said light at said receiver, wherein said detecting step comprises the step of:

directing light received at said receiver which is substantially only of the frequency used for said pilot information to photodetector circuitry which produces an output signal indicative of the strength of the light directed to it;

generating a reference signal of constant amplitude;

producing an output indicative of an amount by which said output of said photodetector circuitry differs from said reference signal;

amplifying said information as received a received via said light at said receiver by an amount influenced by said output indicative of an amount by which said output of said photodetector circuitry differs from said reference signal.

17. The method defined in claim 16 wherein in said amplifying step said information is amplified to a greater degree when said strength detected in said detecting step is relatively low and to a lesser degree when said strength detected in said detecting step is relatively high.

18. The method defined in claim 17 wherein said amplifying step comprises the step of:

using the output signal of said photodetector circuitry to control the gain of a variable gain amplifier to which said information as received at said receiver is applied.

19. The method defined in claim 16 wherein said light is amplitude modulated at different frequencies to represent said information and said pilot information, respectively, and wherein said detecting step comprises the steps of:

directing said light received at said receiver to a photodetector which produces an electrical signal indicative of the light directed to it; and detecting the strength of a component of said electrical signal which has the frequency used to amplitude modulate the light with said pilot information.

20. The method defined in claim 19 wherein said amplifying step comprises the step of:

using the detected strength of said component of said electrical signal in control of the amount by which said electrical signal is amplified.

* * * * *